(12) United States Patent
Hamlin (10) Patent No.: US 8,816,290 B2
(45) Date of Patent: Aug. 26, 2014

(54) DUAL MODE PIXEL ARRAY DETECTOR

(71) Applicant: Area Detector Systems Corporation, Poway, CA (US)

(72) Inventor: Ronald C. Hamlin, Poway, CA (US)

(73) Assignee: Area Detector Systems Corporation, Poway, CA (US)

( * ) Notice: Subject to any disclaimer, the term of this patent is extended or adjusted under 35 U.S.C. 154(b) by 0 days.

(21) Appl. No.: 14/137,821

(22) Filed: Dec. 20, 2013

(65) Prior Publication Data

US 2014/0117247 A1 May 1, 2014

Related U.S. Application Data

(63) Continuation of application No. PCT/US2012/044458, filed on Jun. 27, 2012.

(60) Provisional application No. 61/502,159, filed on Jun. 28, 2011.

(51) Int. Cl.
*G01T 1/24* (2006.01)
*G01T 1/16* (2006.01)

(52) U.S. Cl.
USPC .................................... 250/370.08

(58) Field of Classification Search
USPC ................... 250/370.07, 370.08, 370.09
See application file for complete search history.

(56) References Cited

U.S. PATENT DOCUMENTS

| | | | |
|---|---|---|---|
| 6,563,974 B2 | 5/2003 | Agha Riza | |
| 7,512,210 B2 | 3/2009 | Possin et al. | |
| 7,615,753 B2 * | 11/2009 | Audebert et al. | 250/370.07 |
| 2008/0001095 A1 * | 1/2008 | Astley et al. | 250/370.09 |
| 2009/0147091 A1 | 6/2009 | Myers et al. | |
| 2010/0194956 A1 | 8/2010 | Yuan et al. | |
| 2011/0036989 A1 * | 2/2011 | Marks et al. | 250/370.08 |

OTHER PUBLICATIONS

Angello, et al., "Development of a mixed-mode pixel array detector for macromolecular crystallography." Nuclear Science Symposium Conference Record, 2004 IEEE vol. 7 pp. 4667-4671.

Ercan, et al., "Analog pixel array detectors." Journal of Synchrotron Radiation (2006), 13, 110-119.

International Search Report and Written Opinion received in International application No. PCT/US12/044458, dated Nov. 20, 2012, filed on Jun. 27, 2012.

Kraft, et al., "Performance of single-photon-counting PILATUS detector modules." Journal of Synchrotron Radiation (2009) 16, 368-375.

(Continued)

*Primary Examiner* — Mark R Gaworecki
(74) *Attorney, Agent, or Firm* — Knobbe Martens Olson & Bear LLP (57) ABSTRACT

Devices for detecting electromagnetic radiation, and method of configuring the devices, are disclosed. In one aspect, a pixel array detector includes a plurality of dual-mode pixels arranged in an array. Each dual-mode pixel includes a mixed-mode sensor configured to detect accumulated charge created by electromagnetic radiation incident on the pixel. Each dual-mode pixel further includes a digital-mode sensor configured to count individual photons incident on the pixel. Each dual-mode pixel includes a switch configured to selectively couple the mixed-mode sensor and the digital sensor with a diode associated with the pixel. The pixel array detector further includes a controller configured to configure each pixel of the plurality of dual-mode pixels into either mixed-mode or the digital-mode.

16 Claims, 5 Drawing Sheets

(56) References Cited

OTHER PUBLICATIONS

Krüger et al., "CIX—A Detector for Spectral Enhanced X-ray Imaging by Simultaneous Counting and Integrating".

Radicci, et al., "EIGER a new single photon counting detector for X-ray applications: performance of the chip." Feb. 9, 2012 The $9^{th}$ International Conference on Position Sensitive Detectors. JINST 7 C02019.

* cited by examiner

DUAL MODE PIXEL ARRAY DETECTOR

CROSS-REFERENCE TO RELATED APPLICATIONS

This application is a Continuation Application of PCT Application No. PCT/US2012/044458, filed Jun. 27, 2012, which is based upon and claims the benefit under 35 USC §119(e) of U.S. Provisional Application 61/502,159, filed Jun. 28, 2011, the entire contents of both of which are incorporated herein by reference.

BACKGROUND

1. Field

The present application relates to electronic systems, and more particularly to X-ray detection arrays.

2. Description of the Related Technology

In X-ray crystallography and other natural and material sciences, an ongoing goal is the development of a high-dynamic-range, high-resolution, high-bandwidth imaging system. Currently, detector arrays are typically composed of either analog pixels, digital pixels, or mixed-mode pixels. Analog pixels, or photon integrating pixels, typically digitize charge accumulated on a capacitor caused by incident photons over an exposure period. Digital pixels count individual photons incident on the pixel during the exposure period. Because each photon is counted by discrimination logic, digital pixels tend to have lower noise for weak exposures. Furthermore, their design allows for room temperature operation. In contrast, analog pixels tend to have higher noise rates for weak exposures. On the other hand, digital pixels can only count as fast as their reset time, which is typically on the order of 100 ns. Thus, when two photons arrive within a short period of time, only one will be counted. This fundamental flux limitation can cause inaccuracies in strong exposures. Furthermore, digital pixels tend to have systematic errors when photons strike the corners of pixels because the charge split between pixels may not reach the detection threshold. Digital pixels also require recalibration when changing the energy of the photons.

Mixed-mode pixels combine some advantages of both the analog and digital pixels. Mixed-mode pixels allow charge to accumulate on a capacitor until it reaches a threshold, and then remove that charge. The number of times the charge reaches the threshold during the exposure period is counted, and any remaining charge at the end of the exposure period is digitized. Because mixed-mode pixels count charge ramps, they do not exhibit the same flux limitations of digital pixels. Similarly, there are no systematic errors when photons strike pixel corners because the charge distributed between the pixels is all accounted for. However, mixed-mode pixels have greater cooling needs, and read noise is still greater than digital pixels.

There is a need for improved imaging systems with high-dynamic-range and high-resolution, and methods for configuring those systems.

SUMMARY OF CERTAIN INVENTIVE ASPECTS

The systems, methods and devices of the present disclosure each have several innovative aspects, no single one of which is solely responsible for the desirable attributes disclosed herein.

In one aspect, a pixel array detector is provided. The pixel array detector includes a plurality of dual-mode pixels arranged in an array. Each dual-mode pixel includes a mixed-mode sensor configured to detect accumulated charge created by electromagnetic radiation incident on the pixel. Each dual-mode pixel further includes a digital-mode sensor configured to count individual photons incident on the pixel. Each dual-mode pixel further includes a switch configured to selectively couple the mixed-mode sensor and the digital sensor with a diode associated with the pixel. The pixel array detector further includes a controller configured to configure each pixel of the plurality of dual-mode pixels into either the mixed-mode or the digital-mode.

In various embodiments, the digital-mode sensor can include a charge-sensitive amplifier, a shaper, and a comparator. The mixed-mode sensor can include a capacitor, a slow amplifier, a comparator, and a precision charge remover. Each dual-mode pixel can further include a multiplexer configured to combine outputs from both the digital-mode sensor and the mixed-sensor path. Each dual-mode pixel can further include a combined counter configured to receive output from the multiplexer. The combined counter can be configured to store a photon count when the pixel is configured in the digital mode. The combined counter can be configured to store a ramp count when the pixel is configured in the mixed mode. The combined counter can include an N-bit counter, where N can have any positive integer value. Each dual-mode pixel can further include separate counters for each of the digital-mode sensor and the mixed-mode sensor. The separate counters can include N-bit counters, where N can have any positive integer value.

In another aspect, a method of configuring a dual-mode pixel array detector is provided. The dual-mode pixel array detector includes a plurality of dual-mode pixels, each capable of being configured into either a mixed-mode or a digital-mode. The method includes accumulating a setup image using a data collection sample. When accumulating the setup image, each pixel in the array is set to be in either mode comprising one of the mixed-mode or the digital-mode. The method further includes reading the setup image. The method further includes determining an intensity distribution of the setup image. The method further includes configuring the detector such that each pixel in the array is configured into one of the mixed-mode or the digital-mode based on the intensity distribution of the setup image.

In various embodiments, accumulating the setup image can include configuring each pixel in the array into the mixed-mode. Accumulating the setup image can include configuring each pixel in the array into the digital-mode. Accumulating the setup image can include illuminating a crystal with X-rays. Determining the intensity distribution can include determining a closed curve. The method can further include configuring each pixel in the array, into one of the mixed-mode or the digital-mode, based on whether the pixel is inside or outside the closed curve. The method can further include determining a threshold value, which can be used to determine the location of the closed curve. Configuring the detector can include configuring each pixel in the array, into one of the mixed-mode or the digital-mode, based on whether a measured intensity at the pixel is above or below the threshold value. The method can further include determining the threshold value based on a predicated amount of dead-time loss that would result from saturation of a digital-mode pixel. The method can further include determining the threshold value based on a predicated amount of signal noise that would result in under-exposure of a mixed-mode pixel.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific embodiments of the invention will now be described with reference to the following drawings, which are provided by way of example, and not limitation.

DETAILED DESCRIPTION OF CERTAIN ILLUSTRATIVE EMBODIMENTS

The following detailed description presents various descriptions of specific embodiments of the invention. However, the invention can be embodied in a multitude of different ways as defined and covered by the claims. In this description, reference is made to the drawings where like reference numerals indicate identical or functionally similar elements.

Embodiments of the invention are operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

Embodiments of the system are comprised of various modules as discussed in detail below. As can be appreciated by one of ordinary skill in the art, each of the modules can comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®. The system may be written in any conventional programming language such as C, C++, BASIC, Pascal, Perl, or Java, and run under a conventional operating system.

Any embodiment of the invention disclosed herein may be implemented as a method, apparatus or article of manufacture using standard programming or engineering techniques to produce software, firmware, hardware, or any combination thereof. The term "article of manufacture" as used herein includes code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Although the following description refers variously to X-rays and X-ray crystallography, a person having ordinary skill in the art will appreciate that the systems and methods described herein can be applied to other electromagnetic frequencies and/or other applications. For example, the systems and methods described herein can be used for diffraction analysis in material science.

Figure 1:
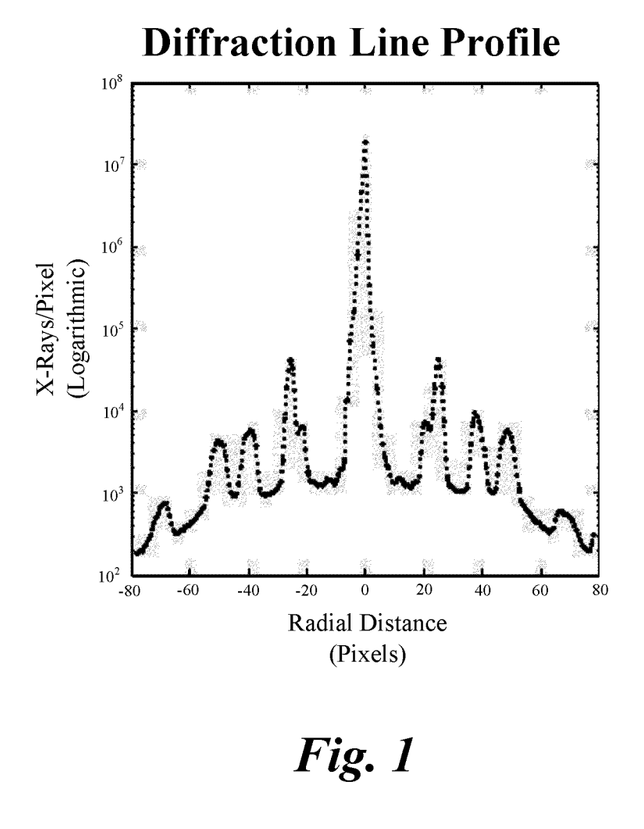
FIG. 1 is a graph showing a diffraction line profile for an exemplary X-ray pixel array detector in a materials science application.

FIG. 1 is a graph showing a diffraction line profile for an exemplary X-ray pixel array detector in a crystallography application. The x-axis shows the radial distance, in pixels, from the center of the pixel array detector. The y-axis shows the number of X-rays incident on each pixel along a line of pixels in the pixel array detector, over the exemplary exposure period. As shown, the number of X-rays incident on the center pixels is several orders of magnitude greater than the number of X-rays incident on the outer pixels. For example, approximately 11,000,000 X-rays were incident on the center pixel (distance 0) and approximately 110 X-rays were incident on the outer pixel (distance 80).

In conventional pixel array detectors, having only one pixel type, the profile shown in FIG. 1 would cause detection errors. For example, a digital pixel-array detector would likely encounter dead-time loss whereby some pixels near the center of the pixel array detector would not count all the X-rays due to the time needed to reset the counter between X-rays. On the other hand, an analog or mixed-mode pixel array detector would not encounter dead-time loss. However, the noise levels in the outer pixels would likely be high.

In applications such as X-ray crystallography, it can be beneficial to have low noise in the outer pixel regions in order to accurately input as many terms as possible into a Fourier transform. Therefore, it can be advantageous to configure the outer pixel regions in the digital-mode. Similarly, is can be important to accurately read the high-flux center pixels. Accordingly, it can be advantageous to selectively configure the inner pixels in the mixed-mode.

In an embodiment, a dual-mode pixel array detector can include a plurality of dual-mode pixels, arranged in an array. Each dual-mode pixel can be configured to act as either a digital-mode pixel or a mixed-mode pixel. In an alternative embodiment, each dual-mode pixel can be configured to act as either a digital-mode pixel or an analog-mode pixel.

Figure 2:
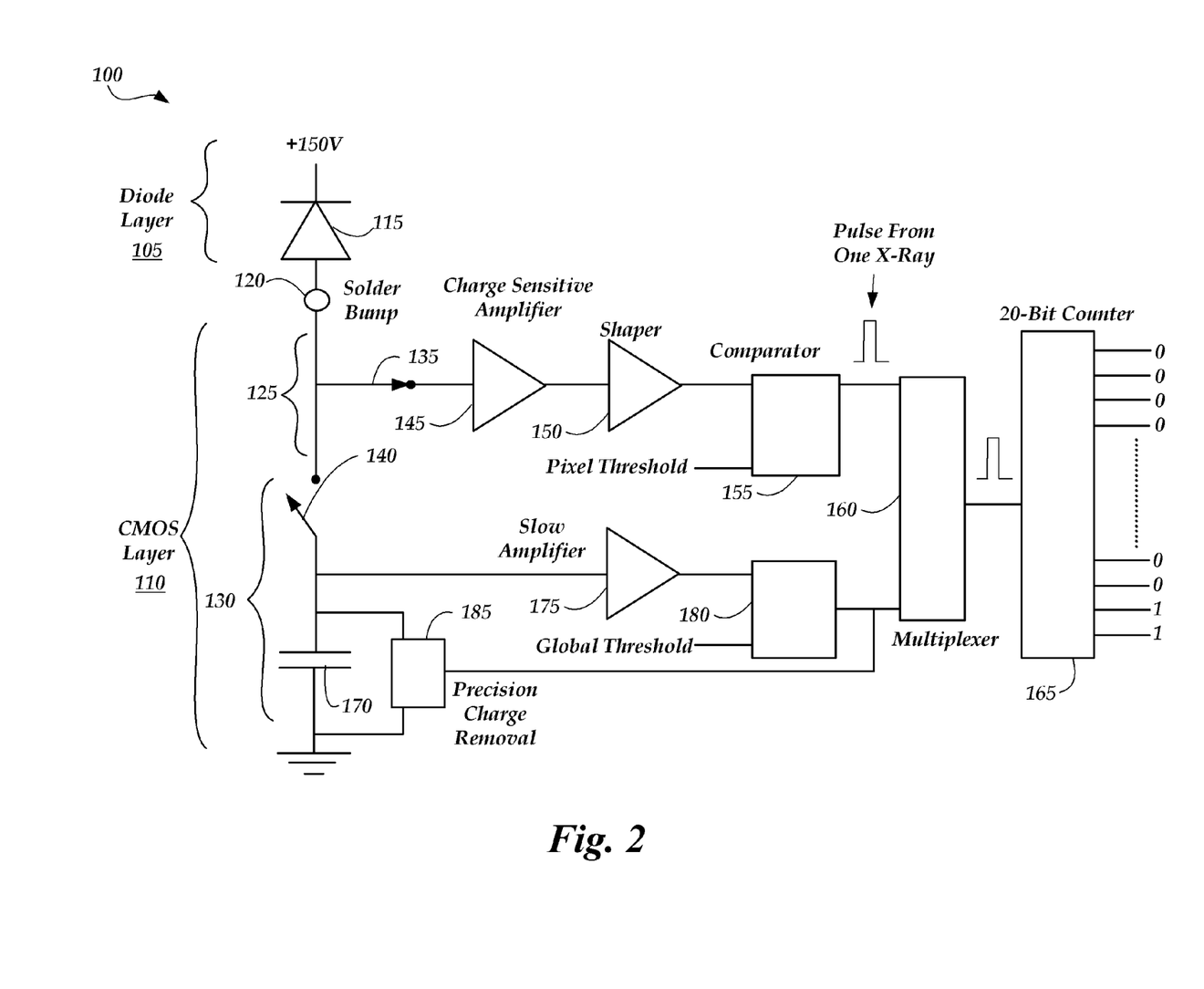
FIG. 2 is a schematic diagram of a dual-mode pixel in counting mode, in accordance with one embodiment.

FIG. 2 is a schematic diagram of a dual-mode pixel in counting mode, in accordance with one embodiment. In the illustrated embodiment, the dual-mode pixel 100 includes a diode detection layer 105 and a CMOS layer 110. The diode detection layer 105 can include a photo-diode 115. The photo-diode 115 can include fully depleted, high-resistivity silicon and can serve to perform direct X-ray conversion at around 150 V. In an embodiment, the photo-diode 115 can include an Al layer over an n+ doped silicon region, over an n− doped silicon region, over a p+ doped silicon region. In an embodiment, the diode detection layer can be around 500 μm thick.

In the illustrated embodiment, a solder bump 120 connects the diode layer 105 with the CMOS layer 110. In an embodiment, there can be one solder bump 120 for every dual-mode pixel 100 in the dual-mode pixel array detector.

Referring still to FIG. 2, the CMOS layer 110 can serve to perform pixel signal processing. The CMOS layer 110 can include a digital-mode path 125 and a mixed-mode path 130. The digital-mode path 125 can be selected using a digital-mode switch 135, and the mixed-mode path 130 can be selected using a mixed-mode switch 140. In various embodiments, the digital-mode switch 135 and the mixed-mode switch 140 can be integrated or implemented separately. The switches 135, 140 can be MOSFET pass gates or any other suitable switch. In an embodiment, the CMOS layer 110 can be an ASIC. A person having ordinary skill in the art will appreciate that processes other than CMOS can be used.

In the illustrated embodiment, the digital-mode path 125 serves to count individual photons incident on the photo-diode 115 when the digital-mode switch 135 is closed and the mixed-mode switch 140 is open. The digital-mode path 125 includes a charge-sensitive amplifier 145, a shaper 150, a comparator 155, a multiplexer 160, and a counter 165. A person having ordinary skill in the art will appreciate that various components of the digital-mode path 125, described individually herein, can be combined, modified, and/or omitted in different designs.

In the illustrated embodiment, the charge-sensitive amplifier 145 serves to amplify the signal received from the photo-diode 115. The charge-sensitive amplifier 145 can convert the relatively low capacity signal, created by an X-ray incident on the photo-diode 115, into an amplified signal suitable for use by the shaper 150. The shaper 150 can convert the amplified output of the charge-sensitive amplifier 145 into a pulse suitable for use by the comparator 155. In an embodiment, the charge-sensitive amplifier 145 and the shaper 150 can be combined.

In the illustrated embodiment, the comparator 150 serves to reject signals received from the shaper 150 that are under a pixel threshold value. The pixel threshold can be set based on amount of energy imparted to the X-rays at the source. In an embodiment, the pixel threshold is set just above a noise floor. In some embodiments, the pixel threshold can be used to configure individual pixels in the dual-pixel array detector. The comparator 150 can output a pulse indicative of the detection of a single X-ray incident on the photo-diode 115.

In the illustrated embodiment, the multiplexer 160 serves to select or combine the outputs from both the digital-mode path 125 and the mixed-mode path 130. The multiplexer can be configured to switch between two inputs based on the state of the switches 135, 140. In one embodiment, the multiplexer can be implemented as an OR gate. The multiplexer outputs a pulse to the counter 165.

In the illustrated embodiment, the counter 165 serves to count the number of pulses received from the multiplexer 165. Because the counter 165 receives pulses via both the digital-mode path 125 and the mixed-mode path 130, the pulses can be indicative of either individual photons (when received via the digital-mode path 125) or the number of times a charge threshold has been reached (when received via the mixed-mode path 130). In the illustrated embodiment, the counter 165 is a 20-bit counter.

In various embodiments, the counter 165 can be an 18-bit counter, a 22-bit counter, or any other number of bits. The counter 165 can output the number of pulses received as binary-encoded outputs. In other embodiments, the counter 165 can output the number of pulses received via another encoding scheme, such as one-hot, binary-coded decimal, etc. The counter 165 can be reset after the dual-mode pixel 100 is read.

Referring still to FIG. 2, the illustrated embodiment, the mixed-mode path 130 serves to accumulate charge as multiple photons strike the photo-diode 115, and to count the number of times that charge reaches a threshold value. In the illustrated embodiment, the mixed-mode path 130 is enabled when the digital-mode switch 135 is open and the mixed-mode switch 140 is closed. The mixed-mode path 130 includes a capacitor 170, a slow amplifier 175, a comparator 180, a precision charge remover 185, a multiplexer 160, and a counter 165. A person having ordinary skill in the art will appreciate that various components of the mixed-mode path 130, described individually herein, can be combined, modified, and/or omitted in different designs.

In the illustrated embodiment, the capacitor 170 serves to accumulate charge created when photons strike the photo-diode 115. The slow amplifier 175 serves to amplify the charge stored on the capacitor 170 and output a signal suitable for use by the comparator 180. In the illustrated embodiment, the slow amplifier 175 has a response time slow enough such that the output is not affected by transient spikes caused by individual photons incident on the photo-diode 115.

In the illustrated embodiment, the comparator 180 serves to reject signals received from the slow amplifier 175 that are under a global threshold value. The global threshold can be set based on the capacity of the capacitor 170, the speed at which the comparator 180 and the counter 165 can operate, and/or the flux expected to be incident on the photo-diode 115. The comparator 180 can output a pulse indicative of the charge accumulated on the capacitor 170 reaching the global threshold.

In one embodiment, the comparator 155 and the comparator 180 can be combined. For example, the multiplexer 160 can be placed in front of a combined comparator (not shown) and configured to accept signals directly from the shaper 150 and the slow amplifier 175. In this case, the threshold input to the combined comparator can be switched between the pixel threshold and the global threshold. Alternatively, the pixel threshold could be set to the global threshold when the dual-mode pixel 100 is set to mixed-mode operation.

Referring still to FIG. 2, in the illustrated embodiment, the precision charge remover 185 serves to remove a set amount of accumulated charge from the capacitor 170 when the comparator 180 indicates that the global threshold has been reached. The precision charge remover 185 can be configured to remove an amount of charge from the capacitor 170 equal to the global threshold. Removal of the threshold amount of charge can serve to prepare the capacitor 170 for the next round of charge accumulation.

As discussed above, the multiplexer 160 serves to combine the outputs from both the digital-mode path 125 and the mixed-mode path 130. When the mixed-mode path 130 is active, the multiplexer 160 passes the output of the comparator 180 to the counter 165. Similarly, when the mixed-mode path 130 is active, the counter 165 serves to count the number of times a charge threshold has been reached.

As shown in FIG. 2, digital-mode switch 135 is closed and the mixed-mode switch 140 is open. Accordingly, charge created by photons incident on the photo-diode 115 is conveyed to the charge sensitive amplifier 145 where it is amplified and then shaped by the shaper 150 into a signal usable by the comparator 155. The comparator 155 outputs a pulse to the multiplexer 160 (when the charge meets the pixel threshold) and the pulse is counted by the counter 165.

Because the counter 165 can be shared between the digital-mode path 125 and the mixed-mode path 130, the dual-mode pixel 100 can use less silicon area than a pixel having separate counters. Smaller pixels can advantageously allow higher pixel density, resulting in greater resolution. Greater resolution can allow higher-accuracy models in applications such as X-ray crystallography.

Figure 3:
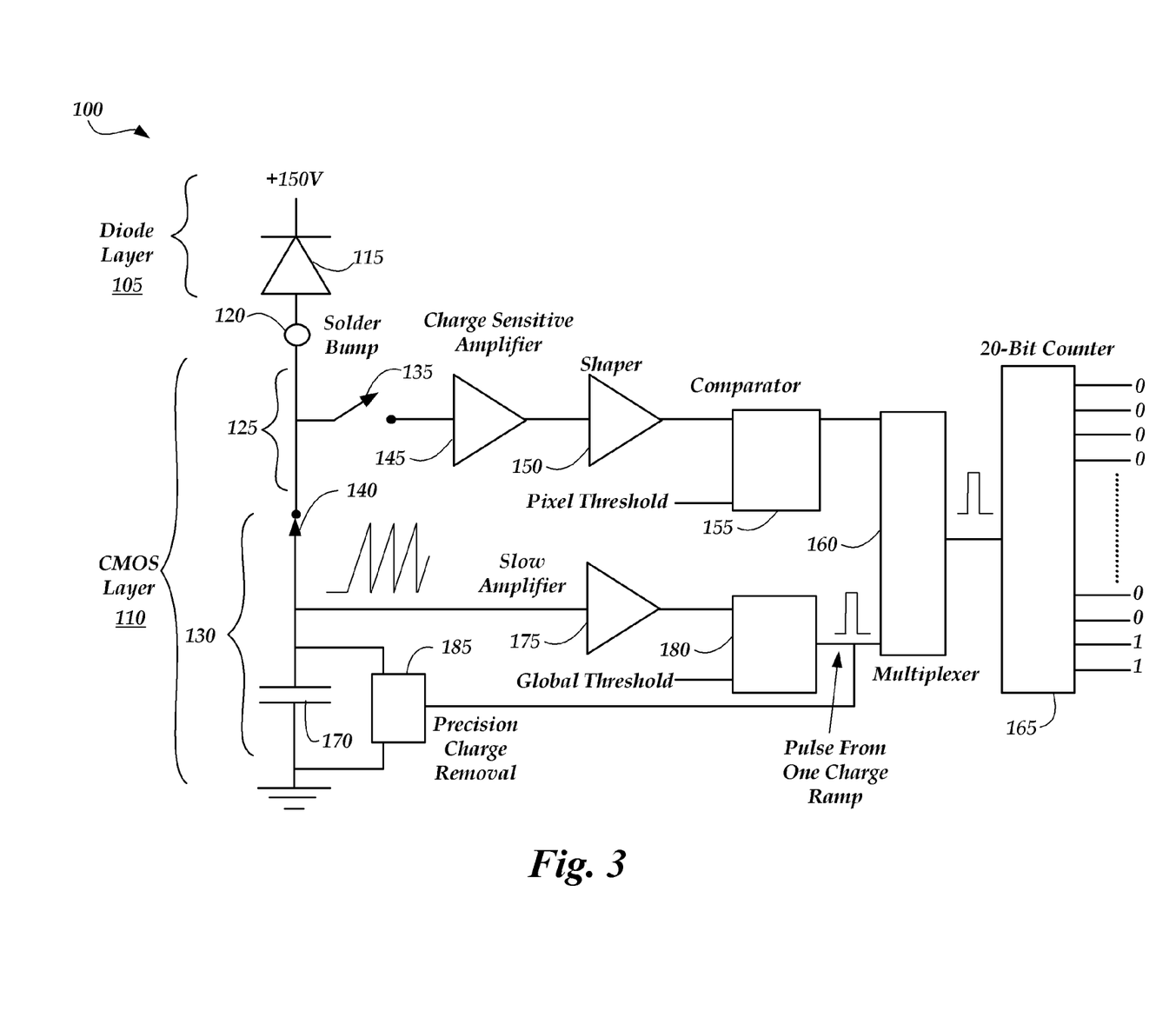
FIG. 3 is a schematic diagram of a dual-mode pixel in mixed mode, in accordance with one embodiment.

FIG. 3 is a schematic diagram of a dual-mode pixel in mixed mode, in accordance with one embodiment. In the illustrated embodiment, the digital-mode switch 135 is open and the mixed-mode switch 140 is closed. Accordingly, charge created by photons incident on the photo-diode 115 is conveyed to the capacitor 170 and amplified by the slow amplifier 175. When the charge accumulated on the capacitor 170 reaches the global threshold, the comparator 180 outputs a pulse, which is communicated through the multiplexer 160 to the counter 165.

Figure 4:
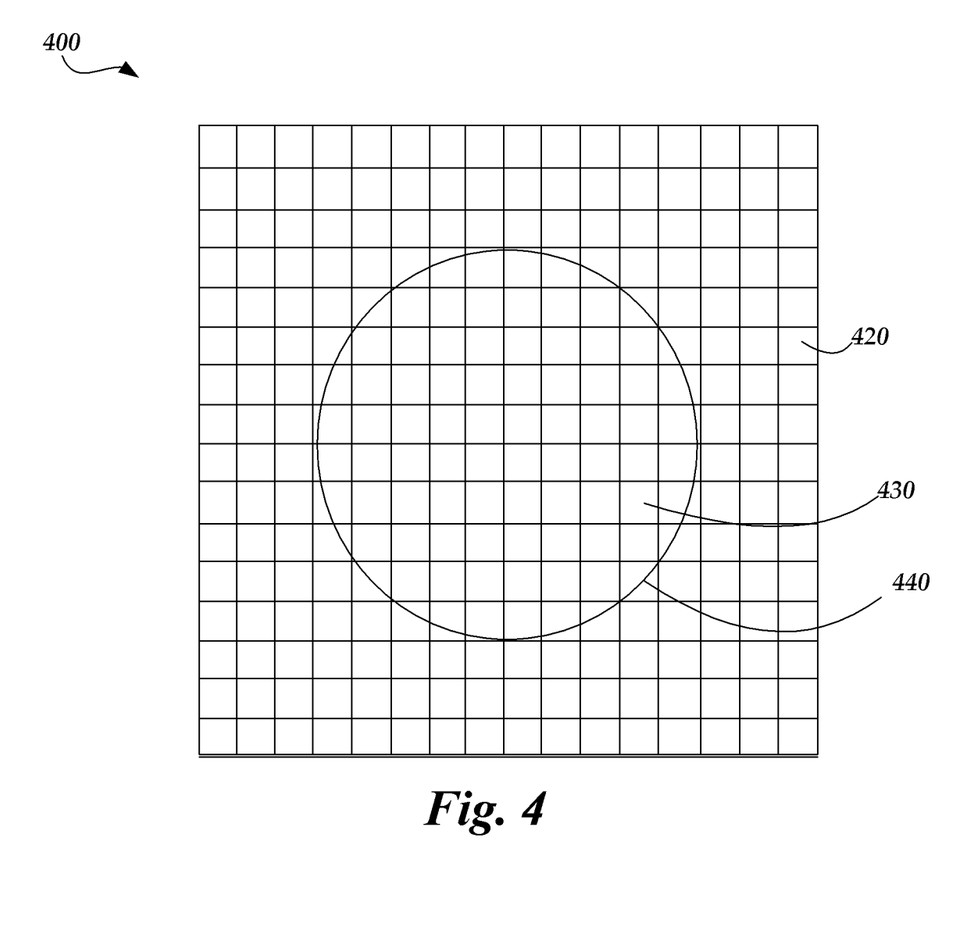
FIG. 4 is a schematic diagram of a pixel configuration in a dual-mode pixel array detector, in accordance with one embodiment.

FIG. 4 is a schematic diagram of a pixel configuration in a dual-mode pixel array detector, in accordance with one embodiment. In the illustrated embodiment, the dual-mode pixel array detector 400 includes a plurality of dual-mode pixels (e.g. pixels 420, 430) arranged in a plurality of rows and columns. Each dual-mode pixel (e.g. pixels 420, 430) in the dual-mode pixel array 400 can be configured to act as either a digital-mode pixel or a mixed-mode pixel. In an alternative embodiment, each dual-mode pixel can be configured to act as either a digital-mode pixel or an analog-mode pixel. In an embodiment, each dual-mode pixel is the dual-mode pixel 100 described above with respect to FIG. 2.

In the illustrated embodiment, pixels substantially outside a closed curve 440 (which can be a circle) are configured as digital-mode pixels and pixels substantially inside the closed curve 440 are configured as mixed-mode pixels. For example, the pixel 420, which is outside the closed curve 440, is configured as a digital-mode pixel. Similarly, the pixel 430, which is inside the closed curve 440, is configured as a mixed-mode pixel.

In an embodiment, the closed curve 440 can be chosen by analyzing a diffraction line profile, or two-dimensional X-ray image, such as that described above with respect to FIG. 1. In an embodiment, the closed curve 440 can be chosen so as to reduce or minimize the number of errors in the system as a whole. For example, the location of mixed-mode pixels can be chosen to reduce or minimize the amount of dead-time loss that would result from a high number of photons saturating a digital-mode pixel. Similarly, the location of digital-mode pixels can be chosen to reduce or minimize the amount of noise that would be recorded by a mixed-mode pixel.

Although the illustrated embodiment shows a circular closed curve 440, a person having ordinary skill in the art will appreciate that different shaped closed curves can be used. In one embodiment, each pixel can be individually configured to reduce or minimize errors. In another embodiment, pixels can be assigned to a group, and each group can be set as a whole to either the digital-mode or the mixed-mode. In an embodiment, each pixel on a single ASIC can be in set to the same mode, and multiple ASICs can be tiled together. In one embodiment, pixel modes can be updated periodically. In another embodiment, pixel errors can be monitored and pixel modes can be updated based on detected errors.

Figure 5:
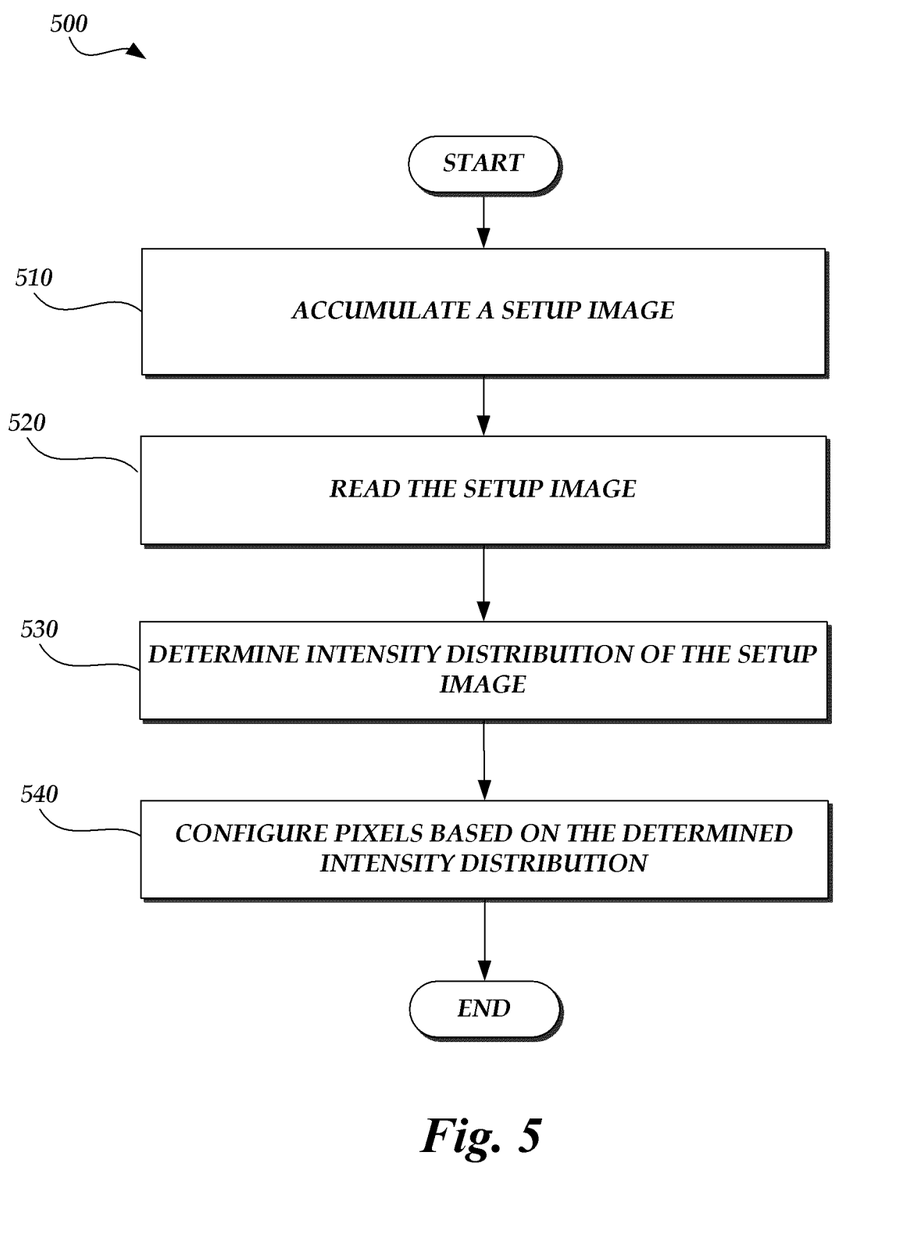
FIG. 5 is a flow chart showing a method of configuring a dual-pixel array detector, in accordance with one embodiment.

FIG. 5 is a flow chart showing a method of configuring a dual-pixel array detector, in accordance with one embodiment. In the illustrated flow chart 500, the system first accumulates a setup image at block 510. At the start of the configuration procedure, each pixel in the array is set to either the mixed-mode or the digital-mode. In one embodiment, all pixels default to the mixed-mode. In another embodiment, all pixels default to the digital-mode. In another embodiment, a default closed curve is used, wherein all pixels substantially outside the closed curve default to the digital-mode and all pixels substantially inside the closed curve default to the mixed-mode. In an embodiment, the default closed curve is chosen such that substantially half of the pixels are set to the mixed-mode and substantially half of the pixels are set to the digital mode.

Next, at block 520, the system reads the setup image from the dual-mode pixel array detector. In an X-ray crystallography application, a sample to be analyzed can be illuminated to obtain the setup image and the result examined. In this case, the data collection images to be accumulated next will likely project a similar distribution of photon intensity. In an embodiment, the multiple setup images can be accumulated by rotating the illuminated sample to at least one more angular position. In various embodiments, the next intended data collection sample can be used, or another sample such as a reference sample.

Subsequently, at block 530, the system determines an intensity distribution. The system can analyze the results of the setup image in order to determine where photon intensity is relatively high and where it is relatively low. In an embodiment, as discussed above with respect to FIG. 4, a closed curve can be determined in order to reduce or minimize the number of expected errors. In an embodiment, the closed curve, possibly a circle, is mapped onto the array of detector pixels surrounding an area of highest intensity. The location of mixed-mode pixels can be chosen to reduce or minimize the amount of dead-time loss that would result from a high number of photons saturating a digital-mode pixel. Similarly, the location of digital-mode pixels can be chosen to reduce or minimize the amount of noise that would be recorded by a mixed-mode pixel.

Finally, at block 540, the system configures the detector pixels in the dual-mode pixel array detector based on the intensity distribution determined at block 530. Configuration can include setting each pixel to either the mixed-mode or the digital mode. In an embodiment, the analog mode can be used. In embodiments where a closed curve is used, the system can set pixels substantially outside the closed curve as digital-mode pixels and can set pixels substantially inside the closed curve as mixed-mode pixels.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

When implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A pixel array detector comprising:
   a plurality of dual-mode pixels arranged in an array, each dual-mode pixel comprising:
      a mixed-mode sensor configured to detect accumulated charge created by electromagnetic radiation incident on the pixel;
      a digital-mode sensor configured to count individual photons incident on the pixel;
      a switch configured to selectively couple the mixed-mode sensor and the digital sensor with a diode associated with the pixel;
      a multiplexer configured to combine outputs from both the digital-mode sensor and the mixed-sensor path; and
      a combined counter configured to receive output from the multiplexer; and
   a controller configured to configure each pixel of the plurality of dual-mode pixels into either the mixed-mode or the digital-mode.

2. The pixel array detector of claim 1, wherein the digital-mode sensor comprises a charge-sensitive amplifier, a shaper, and a comparator.

3. The pixel array detector of claim 1, wherein the mixed-mode sensor comprises a capacitor, a slow amplifier, a comparator, and a precision charge remover.

4. The pixel array detector of claim 1, wherein the combined counter is configured to store a photon count when the pixel is configured in the digital mode.

5. The pixel array detector of claim 1, wherein the combined counter is configured to store a ramp count when the pixel is configured in the mixed mode.

6. The pixel array detector of claim 1, wherein the combined counter comprises an N-bit counter, where N can have any positive integer value.

7. A method of configuring a dual-mode pixel array detector, the detector comprising a plurality of dual-mode pixels each comprising a mixed-mode sensor configured to detect accumulated charge created by electromagnetic radiation incident on the pixel, a digital-mode sensor configured to count individual photons incident on the pixel, a switch configured to selectively couple the mixed-mode sensor and the digital sensor with a diode associated with the pixel, a multiplexer configured to combine outputs from both the digital-mode sensor and the mixed-sensor path, and a combined counter configured to receive output from the multiplexer, and capable of being configured into either a mixed-mode or a digital-mode, the method comprising:

accumulating a setup image, using a data collection sample, wherein each pixel in the array is set to be in either mode comprising one of the mixed-mode or the digital-mode;

reading the setup image;

determining an intensity distribution of the setup image; and     configuring the detector such that each pixel in the array is configured into one of the mixed-mode or the digital-mode based on the intensity distribution of the setup image.

8. The method of claim 7, wherein accumulating the setup image comprises configuring each pixel in the array into the mixed-mode.

9. The method of claim 7, wherein accumulating the setup image comprises configuring each pixel in the array into the digital-mode.

10. The method of claim 7, wherein accumulating the setup image comprises illuminating a crystal with X-rays.

11. The method of claim 7, wherein determining the intensity distribution comprises determining a closed curve.

12. The method of claim 11, further comprising configuring each pixel in the array, into one of the mixed-mode or the digital-mode, based on whether the pixel is inside or outside the closed curve.

13. The method of claim 7, further comprising determining a threshold value for at least one of: pixel intensity, dead-time loss, and signal noise.

14. The method of claim 13, wherein configuring the detector comprises configuring each pixel in the array, into one of the mixed-mode or the digital-mode, based on whether a measured intensity at the pixel is above or below the threshold value.

15. The method of claim 13, further comprising determining the threshold value based on a predicated amount of dead-time loss that would result from saturation of a digital-mode pixel.

16. The method of claim 13, further comprising determining the threshold value based on a predicated amount of signal noise that would result in under-exposure of a mixed-mode pixel.

* * * * *